(12) United States Patent
Giberson et al.

(10) Patent No.: US 7,004,626 B1
(45) Date of Patent: Feb. 28, 2006

(54) FAST ACTING THERMOCOUPLE

(75) Inventors: Melbourne F. Giberson, East Nantmeal Township., Chester County, PA (US); Gerald L. Abrams, Lower Providence Township, Montgomery County, PA (US)

(73) Assignee: Turbo Research, Inc., Lionville, PA (US)

( * ) Notice: Subject to any disclaimer, the term of this patent is extended or adjusted under 35 U.S.C. 154(b) by 0 days.

(21) Appl. No.: 10/794,379

(22) Filed: Mar. 5, 2004

(51) Int. Cl.
*G01K 7/06* (2006.01)
*G01K 1/00* (2006.01)
*H01L 35/04* (2006.01)

(52) U.S. Cl. ................. 374/179; 374/208; 136/230

(58) Field of Classification Search ........... 374/179, 374/208, 148, 144; 136/230, 232, 233, 241
See application file for complete search history.

(56) References Cited

U.S. PATENT DOCUMENTS

| | | | | |
|---|---|---|---|---|
| 2,466,175 A | * | 4/1949 | Kretsch et al. ............ 136/228 |
| 2,706,411 A | * | 4/1955 | Bircher ..................... 374/179 |
| 3,516,871 A | * | 6/1970 | Lewis ....................... 136/201 |
| 3,935,032 A | * | 1/1976 | Brandeberry et al. ...... 136/230 |
| 4,749,415 A | * | 6/1988 | Barton ...................... 136/230 |
| 4,934,831 A | * | 6/1990 | Volbrecht .................. 374/183 |
| 5,697,706 A | * | 12/1997 | Ciaravino et al. .......... 374/166 |
| 6,632,017 B1 | * | 10/2003 | Cress ........................ 374/179 |
| 6,698,922 B1 | * | 3/2004 | Adachi et al. .............. 374/208 |
| 2001/0033599 A1 | * | 10/2001 | Isshiki et al. ............... 374/179 |

FOREIGN PATENT DOCUMENTS

| | | | |
|---|---|---|---|
| DE | 3319793 A1 | * | 12/1984 |
| JP | 56016829 A1 | * | 2/1981 |
| JP | 61118650 A | * | 6/1986 |
| JP | 63269027 A | * | 11/1988 |

* cited by examiner

*Primary Examiner*—Diego Gutierrez
*Assistant Examiner*—Mirellys Jagan
(74) *Attorney, Agent, or Firm*—Polster, Lieder, Woodruff & Lucchesi, L.C.

(57) ABSTRACT

In a two wire thermocouple, a hollow tip is formed of the material of one of the thermocouple wires, the tip being adapted to extend into a medium the temperature of which is to be measured, both wires extending into a passage in the tip through an open outer end of the passage toward an inner end of the passage, one of the two thermocouple wires, of a material different from said tip, extending entirely through the passage and being welded at the outside of said tip to form a thermocouple junction and the other of the wires, of the same material as the tip, being welded to the tip at a place spaced from the junction.

31 Claims, 2 Drawing Sheets

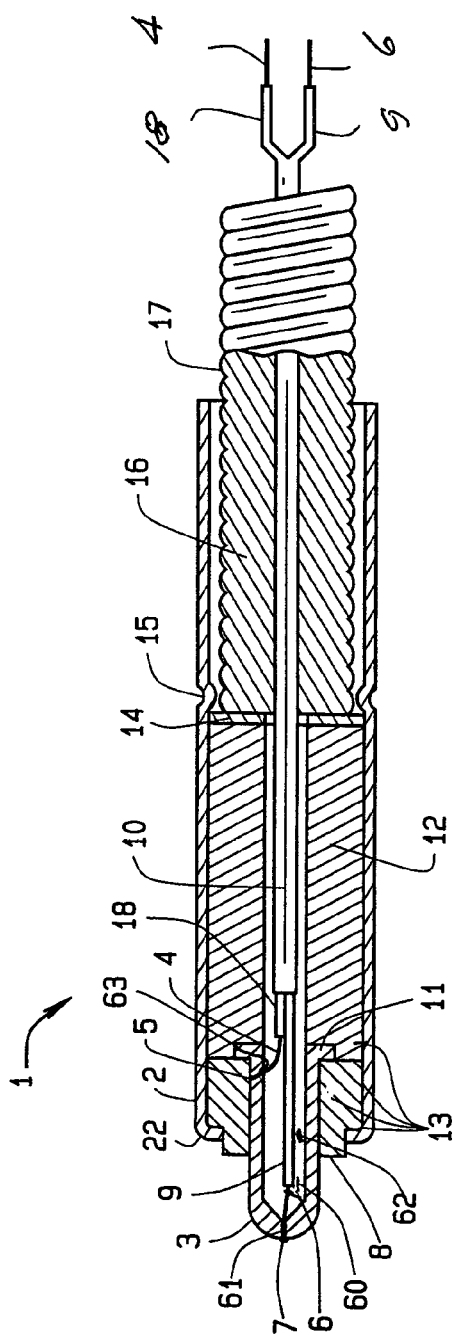
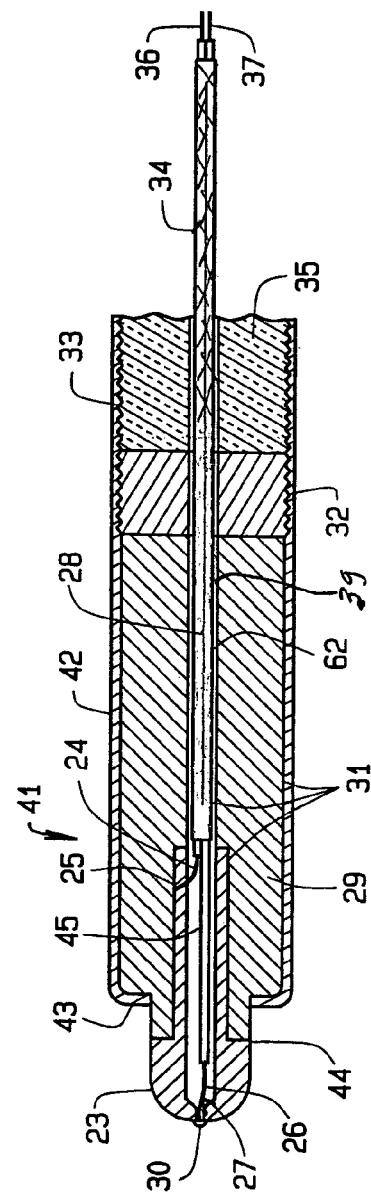
FIG. 1
FIG. 2

FAST ACTING THERMOCOUPLE

CROSS REFERENCE TO RELATED APPLICATSTATEMENT REGARDING FEDERALLY SPONSORED RESEARCH OR DEVELOPMENT

BACKGROUND OF THE INVENTION

This invention has to do with a thermocouple for use in applications where it is essential to measure a rapidly changing temperature of a material, particularly a liquid, with a minimum of time delay. For instance, when the temperature of the liquid being measured makes a step change, say, 50 degrees Fahrenheit (F), a fast acting thermocouple as envisaged by this invention achieves the same change in less than 2 seconds. Faster acting thermocouples, with the ability to make this temperature step change in a few tenths of a second are commercially available today, but they do not have other characteristics that are included in the present invention that are required for the applications for which the present invention is intended to be used.

There are many different types and shapes of devices for measuring the temperature of materials, both solid and liquid, which are commercially available today. The devices of primary interest here are those that can measure the temperature at a given location, and at the same time, operate a switch indicating that the temperature has reached and/or exceeded a pre-set set point temperature. Among these are (a) Bourdon tube type consisting of a bulb, tube, expansion device with internal liquid, and switch, (b) direct acting temperature switch, (c) thermocouple sensor (TC) and a readout instrument with switch, and (d) resistance temperature device (RTD) and readout instrument with switch.

The applications of interest here are those in which there is a liquid, such as a process liquid, wherein the temperature may vary, and vary quite substantially, and the pressure at the point where the temperature is measured may be high and may be cyclic at a high frequency. For example, the liquid may be an oil, such as an automatic transmission fluid (ATF). The process may be a fluid drive wherein the oil is used to transmit power from an impeller to a runner, wherein the impeller is a vaned structure fixedly attached to an input shaft that is driven by a prime mover such as a Diesel engine, and the runner is a vaned structure fixedly attached to an output shaft, and the output shaft is connected by a power train to, and functionally transmitting power to a load, such as a comminuting mill, for example, a hammer mill.

Extensive discussion of fluid drive technology is provided in U.S. Pat. Nos. 5,331,811, 5,315,825, and 5,303,801. A detailed discussion of the particular application for which this thermocouple was first devised is provided in a co-pending application, identified as U.S. Ser. No. 10/171,125. In many fluid drives in power plants, normal mineral oil such as light turbine oil is used, and the normal operating temperature range may be between 130 degrees Fahrenheit and 180 degrees Fahrenheit, being limited to 180 degrees F. in order to maintain a long life without deterioration, or oxidation, of the oil. In other applications using ATF oil, the upper limit of the temperature range may be 220 degrees Fahrenheit, with oil changes from time to time. In other applications, certain synthetic oils, such as Mobil 627, the normal operating temperature range may extend to 250 degrees Fahrenheit.

There are many temperature measuring devices that are commercially available that will measure temperatures in these ranges. However, when fluid drives experience fault conditions that stop the output shaft, that is, rotation of the output shaft and the attached runner ceases, it is very likely that the oil within the fluid drive impeller and runner chamber as well as the impeller, runner, and impeller casing will experience much higher temperatures, on the order of 300 degrees F., sometimes up to 450 degrees F., and the rise in temperature will be experienced extremely rapidly after the initiation of such a fault. Almost always, a fault of this type occurs in the equipment driven by the fluid drive, examples being (1) a pump for which the supply of the liquid being pumped stops, and the pump overheats and freezes, so that the pump shaft can not rotate, and any shafting connected to it including a fluid drive can not rotate; and (2) a hammer mill that becomes jammed, and can no longer rotate.

Such high temperatures, particularly when they occur rapidly, can damage the components of the fluid drive rotating elements, bearings, surrounding housings, the oil, the oil conditioning system, oil pumps, and seals. When the paint on the fluid drive, oil pipes, heat exchanger, and pumps is discolored and peels off, almost always, severe damage has occurred to the internal components. The heating occurs when the fluid drive impeller and runner cavities are filled, or partially filled, with oil and the impeller continues to rotate while the runner stops, causing power to be dissipated in the oil within the fluid drive element which is many times the power loss dissipated in the oil during normal operation, with the obvious consequence that the oil temperature rapidly soars to the aforementioned excessive temperatures.

Clearly, it is advantageous to avoid or to minimize the temperature excursions of the oil and other parts of the fluid drive system.

After such an event occurs, the damage assessment is made and will often not address the instrumentation, including instrumentation of all types. The instrumentation may be severely damaged by the event and the damage may not be detected because such events are rare and there is little experience with the damage such over-heating events can do. Every piece of instrumentation must be thoroughly inspected and tested. Of most concern in this application is temperature measuring instrumentation. One example of such damage is this: A Bourdon tube based device can be damaged by an over-temperature event because the fluid expands more than is anticipated and will cause some portion of the bulb or measuring capsule to expand and yield, causing the instrument to have an offset in its measuring and switching capability.

Another example occurs when the sensor bulb is properly located, but the instrument with switch is mounted onto the side of a fluid drive subject to process temperature, instead of being mounted as anticipated on a remote stand not affected by the temperature of the fluid drive. A problem occurs when the instrument is calibrated in a test room at 70 degrees F., and the instrument is mounted on a fluid drive the temperature of which varies substantially. It has been found that the pre-set temperature at which the switch changes state in the test room bears little relation to the temperature at which the switch actually operates when it is mounted on a fluid drive.

To avoid this type of problem, a sensor and an instrument must be selected and the instrument must be located so that the process temperature is measured with sufficient accuracy and repeatability and so that the switch operates at the expected pre-set temperature with sufficient accuracy and repeatability.

Experience has shown that there is no appreciable time delay in most instruments and switching devices for thermocouple sensors. Almost all of the time delay is in the thermocouple and this delay is related to the mass of metal to be heated (or cooled) and any insulation between the liquid outside of the external profile of the thermocouple and the junction of the two metals in the bead. It is exceedingly important that the temperature excursion be detected as rapidly as possible after the fault occurs that causes the over-temperature excursion in order to minimize the maximum temperature experienced and in order to minimize the duration of such over-temperature event.

Self contained sensor and switch units, such as produced under the name of Kaiser have been found to be damaged and non-functional after over-temperature events with temperatures over 450 degrees F., confirming prior experience that instruments containing switches that were mounted on the side of fluid drives did not work properly when exposed to high temperature conditions. Consequently, one way to be certain that the sensor and mated instrument with switch will operate with sufficient accuracy, and repeatability, for millions of over-temperature cycles, is this: The sensor must be located in the process and the sensor must be rated for temperatures that are well above the anticipated maximum temperature to be experienced by the sensor in an over-temperature event, and the instrument with switch must be mounted remotely in an environment where the temperature and vibration do not affect the operability of the instrument readout and switching function. This is achievable using presently available thermocouple technology and available instrumentation with readouts and switches, so long as fast acting response of indicated temperature at the readout instrument and switch is not required.

Three well known American vendors of a wide range of thermocouples and the associated instrumentation, as well as many other types of temperature, pressure and other sensing and readout devices are Pyco of Pennsylvania, Minco of Minnesota, and Omega of Connecticut. There are others, one of which is FW Murphy of Oklahoma, that offer instrumentation for mobile equipment, typically using 12 to 24 volt DC power for the power supply to operate the instruments.

When measuring temperature of liquids, including oil, in pipes or tanks, it is extremely common to use a thermowell for the thermocouple, RTD, bulb, or other sensing device. A thermowell is essentially a small diameter pipe that is sealed at the end that extends into the liquid or flowstream and is threaded or welded into the pipe or tank. The use of a thermowell permits the sensing device to be removed and replaced without shutting down or otherwise endangering the process. For the present objective of having a fast acting thermocouple, the problem of using a thermowell is that the thermowell has a substantial heat capacity, and the thermowell must be heated to the temperature of the liquid before the thermocouple inside can be exposed to the temperature of the thermowell, which means that a separate thermowell can not be used for a fast acting thermocouple as intended by the present invention.

A thermocouple is made by welding the ends of a pair of wires into a bead or junction, and using a voltmeter capable of reading millivolts to measure the voltage at the other end of the pair of wires. As the temperature of the junction changes, the voltage induced into the wires changes, a very simple and reliable method for measuring temperature at a point remote from the readout instrument. The smaller the bead is that forms the junction, the faster the response time. The critical design problems for a thermocouple for a specific application relate to such items as the materials from which to make the wires, wire diameter, insulation of the wires, insulation for the junction, overall size, shape, length and diameter, as well as protective coating or outside shield to address survivability and endurance when the thermocouple is subjected to mechanical vibration, liquid absolute pressure, liquid jetting pressures, over-temperature excursions, and the like.

Typical materials used to make the pair of wires, hence, the thermocouple junction, are Copper-Constantan, Iron-Constantan, and Chromel-Alumel. In other words, one wire is copper from the junction to the readout device, and the other wire is constantan from the junction to the readout device. There are other thermocouple junctions (see, for example, U.S. Pat. Nos. 3,942,242 and 4,224,461). Each combination of materials of a junction has a useful temperature range, and has a unique millivoltage vs. temperature scale. There is overlap in the useful temperature range, so it is critical to know the materials of the junction in order to be able to convert the millivolt reading to temperature. The length of the wires to the readout device is not critical, up to several hundred feet can be used. It is critical that the material of each wire from junction to readout must be the same, that is, one wire is entirely copper of the same constituency throughout, and one wire is entirely constantan of the same constituency throughout, because the temperature of intermediate junctions of non-identical materials will affect the voltage at the readout device.

An exposed thermocouple junction at the end of a pair of wires, with the wires typically covered by insulation such as woven fiberglass, can be inserted directly into a liquid, and this type of thermocouple will provide very accurate readings and will be very fast acting. However, in most applications, it is essential that there are no leaks of the process liquid through the wall of the pipe or vessel at the location where the thermocouple is inserted, which means that some form of shield or protective coating, such as a tube with the end welded closed, be used, along with a fitting mounted in the pipe or tank to seal the connection to the tube. It is very common to use a piece of stainless steel tubing, ⅛ inch, 3/16 inch, or ¼ inch diameter, as an outer shield, or sheath, and to insert the thermocouple junction and wires into the tube, or outer shield, stopping when the thermocouple junction hits the closed end of the tube. With regard to grounding of the thermocouple, two choices exist: (a) either the thermocouple junction is permitted to hit the closed end of the tube and remain in contact with the tube, called a grounded thermocouple, or alternately, (b) the thermocouple junction is coated with an insulating material and inserted into the tube stopping when the insulation hits the closed end of the tube, this arrangement being called variously and interchangably an ungrounded thermocouple, an insulated thermocouple, or an isolated thermocouple. A variation of the grounded thermocouple is to use a tube with both ends open, and to insert the junction through the tube until it begins to exit from the other open end, and to weld the junction to the end of the tube, so that the tube is sealed and the junction can not be removed from the tip of the tube. A variation of both types, gounded and ungrounded, is that two pairs of wires, each pair of wires having a junction, can be inserted and used, called a duplex thermocouple. The advantage of a duplex thermocouple is that two separate temperature measurements of the same physical location can be measured and used to drive two different readouts, or simply, one thermocouple can be used, and if for some reason it fails, or is suspected of failure, which is more probable, the other thermocouple can be connected to replace the first.

With a tube fitting threaded or welded into the pipe or tank, the thermocouple assembly with protective outer sheath is inserted through the tube fitting with a grommet or metallic sealing ring and the outer locking cover of the fitting is tightened onto the sheath until a seal is made and the thermocouple assembly with sheath can not be removed.

The layer of insulation used in ungrounded thermocouples as described just above provides a delay in heat transfer from the outer protective sheath or tube to the thermocouple junction, hence, ungrounded thermocouples so designed do not qualify as fast acting thermocouples.

Minco makes a grounded thermocouple designed to be fast acting, called a Quick Tip, of which there are several versions. Others manufacture similar devices under other trade names. A common version is a small tube 0.093 inches diameter and perhaps 5/16 inch long, with the wires inserted through an open end of a tube until the wires begin to protrude from the second end of the tube and welded to the second end, sealing it. The total mass of this tube and junction is on the order of a few grams, and it heats very rapidly, with the indicated temperature by the readout device following behind actual changes of the temperature of the liquid by a few hundredths of a second. Another variation is a larger tube, perhaps, 3/16 inch diameter with a flat end; the end is a flat round disk that extends beyond the outside of the tube to a diameter of perhaps 1/4 inch, providing a larger area to collect heat, such as would be useful in a steel backed, Babbitt lined bearing. In such an application, a hole the size of the OD of the tube is drilled through the Babbitt and into the steel behind the Babbitt layer sufficiently deep to install the thermocouple, Babbitt is removed around the hole sufficient for the flange to seat on the steel backing, and another hole is drilled from the outside of the bearing communicating with the hole where the thermocouple tube is to be inserted. After the wires are inserted into the hole from the Babbitt side and extending through the hole and beyond the outside of the bearing and the thermocouple is inserted and the flange is seated, the flat disc, or flange, at the end of the thermocouple is tinned and Babbitt is added. After it cools, the Babbitt surface is machined to suit the surrounding shape of the Bearing surface.

It is essential that the thermocouple is not over-heated and damaged by the high temperatures used to tin the end and to get the Babbitt melted and installed. A version of Quick Tip thermocouple comes with the flat disc at the end already tinned to reduce the time that it is exposed to elevated temperatures, and to assure greater bonding of the Babbitt layer to the tip of the thermocouple. In almost all applications, this arrangement works as intended. However, occasionally, the pressures of the lubricating oil film on the Babbitt layer, and hence, on the flat disc at the end of the thermocouple cause the flat disc to dimple inwardly. Sometimes, the pressures are so great that the end of the thermocouple is pushed into the hole and the sensor is destroyed.

A problem that often occurs with grounded instrumentation, including thermocouples, sometimes unknown to the designer or user, is that other electrical equipment in the area can induce stray voltages into the instrumentation, such stray voltages being either direct current and/or alternating current. Occasionally these stray currents are traced to such conditions as improper grounds or loose ground wires. Since the currents in most instrumentation are very small, on the order of milliamps, such stray voltages induced by the ground loops can easily be sufficiently large to affect, to confuse, or in extreme cases, to mask, actual readings. It is for this reason that almost all instrumentation is ungrounded, unless it is necessary to use a grounded design to get the desired information, such as the Quick Tip thermocouple for a Babbitt bearing, described above.

The thermocouple of this invention is designed and manufactured as a fast acting, ungrounded, high temperature thermocouple that can resist pressures to a few hundred pounds per square inch (psi), perhaps higher pressure in other versions, can survive in a vibrating environment such as fluid couplings attached to and driven by Diesel engines, and fluid drives driving boiler feed pumps or fans in power plants, and can be used with any readout device and switching device suitably designed and calibrated for the materials used in the junctions and wires.

SUMMARY OF THE INVENTION

In accordance with this invention, a thermocouple comprises (a) a small tube on the order of 3 inches long and 0.25 inches diameter, machined from constantan, with one end of the tube, called the tip, being closed but machined to a thin wall and having a very small hole drilled in the center of the tip, a flange machined at the other end of the tube, the OD of the flange being larger than the OD of the tube, and another hole drilled through the wall of the tube near the flange end, (b) two wires as long as required to reach the readout device, one wire being of iron and welded into the hole at the tip of the tube, the other being constantan, being welded into the hole in the side of the tube, (c) an outer protective sheath made from a stainless steel tube 0.500 inches OD and approximately 4 inches long, open at one end and swaged to form a reduced diameter at the other end, on the order of 0.38 inches, approximately 0.13 inches larger than the diameter of the tip tube of constantan, (d) an insulating tube machined from mica based ceramic that has an OD slightly smaller than the ID of the stainless steel tube and an ID slightly larger than the OD of the constantan tip tube and a length such as to permit the tip tube to extend approximately 3/16 inch to 1/4 inch out of the end of the sheath, (e) another insulating tube machined from mica based ceramic that has an OD the same size as the first mica-based ceramic tube, and an ID sufficiently sized for the pair of thermocouple wires to pass through, (f) a ring of stainless steel of the same OD and ID as the second mica-based tube, and (g) high temperature RTV (room temperature vulcanized silicone) in the form of a two-part compound, available from General Electric Co., so that it will cure without exposure to air or to moisture.

The first step in the assembly of the thermocouple is to insert the wires into the tip tube as described and weld them into place. The second step is to mix a suitable amount of RTV and to insert a portion of the RTV into the outer stainless steel sheath. The third step is to cover the first insulating ceramic tube with RTV and insert it into the outer sheath, to install the second insulating ceramic tube over the wires and to pull it down near the tip, covering the wires with RTV where the second insulating ceramic tube goes, move the second insulating ceramic tube down to the tip, and cover the tip tube and second insulating tube with RTV. The fourth step is to insert the tip tube and second insulating tube into the outer sheath and push them until they stop with the tip tube extending beyond the outer stainless steel sheath by the planned amount. The tip tube is inspected to assure that it does not touch the outer sheath. The fifth step is to add a small amount of RTV to the wire hole of the second insulating ceramic tube. The sixth step is to insert the stainless steel ring, to push down hard on it to compress the stack of parts inside the outer sheath. The seventh step is to swage the outer sheath tube at an axial location slightly beyond the stainless steel ring, approximately two inches from either end in this case, so as to reduce the diameter of the outer sheath in order to make it impossible to remove the parts from the outer sheath. The eighth step is to orient the outer sheath with the axis vertical and tip end down so as to let the RTV settle and cure inside.

After the first assembly is complete and first pour of RTV has cured sufficiently, another batch of RTV can be mixed and poured into the open end of the 4 inch long sheath, almost filling it. Then a flexible protective shield, such as a stainless steel wound protective shield, of any desired length can be drawn over the wires and inserted into the open end of the outer sheath to the full available depth, approximately two inches. Again, the outer sheath is stored with the axis vertical and tip end down so that the RTV can cure in the tube, locking in the protective flexible shield for the thermocouple wires.

An alternative arrangement for providing greater insulation and protection of the wires extending from the open end of the outer sheath is constructed as follows: After the first assembly is complete, and the RTV of the first pour is cured sufficiently, another batch of RTV can be mixed and poured into the open end of the 4 inch long sheath, almost filling it. Then an insulating flexible tube having an ID slightly larger than the OD of the wire, having any desired length, and preferably having a thin-wall, can be drawn over the wires and inserted into the RTV in the open end of the stainless steel sheath to the full available depth, approximately 2 inches. Then, the flexible stainless steel wound protective shield of any desired length can be drawn over the flexible insulating tube and inserted into the RTV in the open end of the outer sheath. Materials of insulating flexible tubes include various rubbers or various plastics, a typical plastic being Teflon® (polytetrafluoroethylene), with the selection depending upon the application. Purposes of the flexible insulating tube may include protection for the wires from abrasion during movement of the wound protective shield such as might occur during installation or when exposed to vibration during operation.

Examples of applications to which this invention are particularly suitable are these:

(1) Fluid drive wherein there is a series of holes containing orifices around the periphery of the impeller or impeller casing through which oil exits from the rotating fluid drive circuit and is channeled into a pocket in the outer housing of the fluid drive wherein a temperature sensing device can measure the temperature of the oil. Depending upon the overall design of the fluid drive and the design of the pocket, the oil flow into the pocket can be very smooth or can be a pulsed jet with entrance velocities over 100 feet per second. The thermocouple must be sufficiently strong and durable to survive the pulses. A long thin thermocouple can break due to fatigue, and one in a thermowell may take up to a minute to detect an over-temperature event. The faster the thermocouple can follow the actual temperature of the oil and detect a fault on over-temperature, the faster the supply of circuit oil can be shut off and other actions taken to minimize the maximum temperatures experienced.

(2) Flow of liquid through a pipe for which
   (a) a fast acting thermocouple is required or beneficial; and
   (b) there is a significant drag on any thermocouple or thermowell inserted into the pipe.

(3) Any application where a fast acting thermocouple is beneficial, and there is high turbulence in the liquid surrounding the thermocouple.

BRIEF DESCRIPTION OF THE DRAWING

FIG. 1 is a longitudinal cross-section of a thermocouple of one illustrative embodiment of this invention;

FIG. 2 is a longitudinal cross-section of another embodiment of thermocouple of this invention.

DETAILED DESCRIPTION OF THE INVENTION

Figure 3:
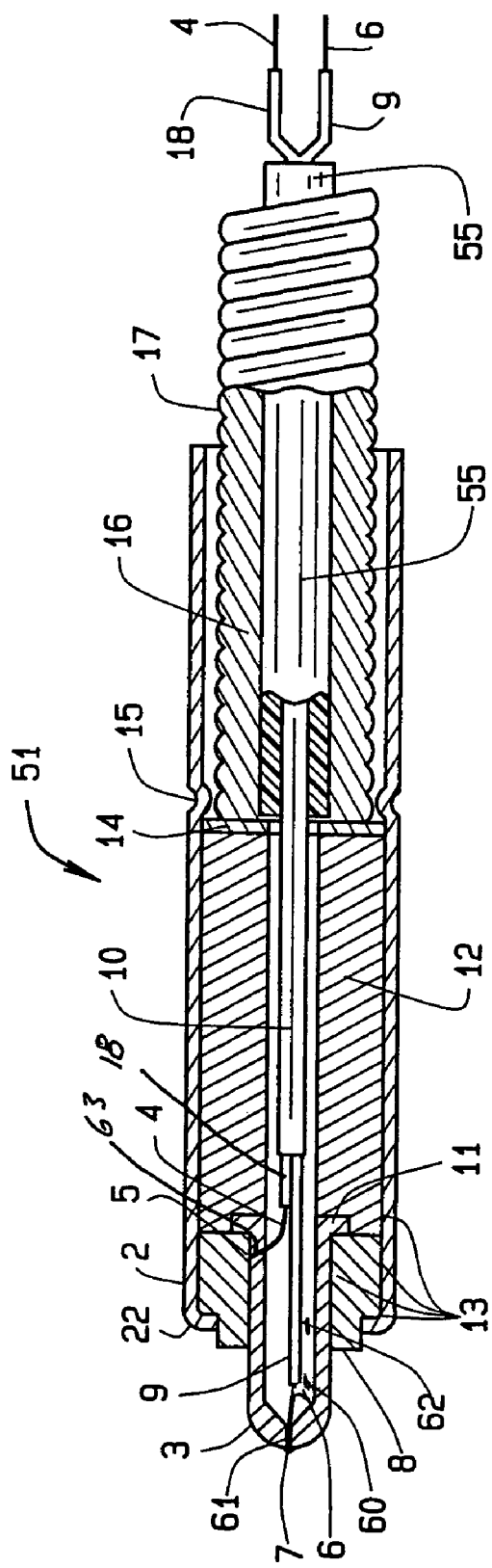
FIG. 3 is a longitudinal cross-section of another embodiment of thermocouple of this invention.

One embodiment of a thermocouple of this invention is shown in cross-section in FIG. 1. Numeral 1 represents a thermocouple assembly. A sheath 2 shown here is a section of a stainless steel tube, with a wall thickness of 0.049 inches, typically, approximately 4 inches long, typically, and swaged in at one end to a reduced diameter 22 as shown. A tip 3 is machined from a piece of solid constantan, an alloy of nominally 60 percent copper and 40 percent nickel, and is a material well known in the thermocouple industry (see, for example, U.S. Pat. No. 3,942,242). The tip has a flange 11 on its inside end and has a hole 60 drilled toward the tip from the flange end, but the hole does not penetrate the tip, leaving a wall thickness on the order of 0.020 inches at the end. A small hole 61 is then drilled through the tip, the diameter of this hole being of a size marginally sufficient to permit an iron conductor 6 to pass through. The hole 60 and small hole 61 together constitute a passage 62, with an open outer, flange, end and a restricted inner end. A second hole 63 is drilled on an angle through the wall of the tip at the location spaced toward the open end of the passage from the hole 61, the size of this hole 63 being marginally sufficient for a constantan conductor to pass through.

A two-conductor cable 10 of constantan and iron, each conductor wrapped with braided fiberglass with another fiberglass braid around the outside, is commercially available and is used herein. Either solid conductor wire or stranded wire can be used, according to the advantages each offers for a given application. The insulation is removed from an end of the wire and from both conductors to reveal the conductors, and the constantan conductor 4 and its insulation 18 are cut shorter than the iron wire 6 and its insulation 9 by the distance from the outer end of the hole 61 to the outer end of the hole 63. The conductors are simultaneously inserted into and through the respective holes, and welded on the outside of the tip. The bead 7 is the thermocouple junction, and it is on the outside of the thin wall tip. The bead at 5 is made of the same material as the tip, both constantan, and this bead is filed or otherwise worked to remove weld material outside of the adjacent profile of the tip.

A tip insulator 8 is shaped on the outside so that the end is exposed through the swaged end of the sheath 2, and the hole on the inside of the tip insulator is sized to permit the tip 3 to pass with a slight gap for a sealant 13 to fill. The sealant used here is a silicone rubber, or two-part Room Temperature Vulcanization (RTV) material that can withstand 500 degrees Fahrenheit constantly with occasional excursions to 650 degrees Fahrenheit. This sealant is made by GE silicon rubber division, and is commercially available. Another, longer insulator 12 is made with a hole though the center suitable for the insulated wire 10 to pass and has a counter-bore at one end to receive the flange 11 of the tip 3. Both insulators are made of hard ceramic material, one example being a mica based ceramic tube that is commercially available, for example, from McMaster-Carr, though the insulators need not be made of the same material if different materials offer advantages for a given application. The use of insulators 8 and 12 to separate the tip from the sheath makes the thermocouple an "ungrounded" thermocouple. Sealant 13 is used to cover all of the parts and to fill the small gaps between the components. A ring 14 is made of steel, preferably stainless steel, and is inserted after the assembled tip, comprised of tip 3 and wire 10, insulators 8 and 12, and RTV 13, is inserted. A swaging operation makes a crimp 15 in the sheath, so that the inside diameter of the crimped tube is reduced to retain the tip, insulators, and ring in the case that the thermocouple is used in a pressured environment. After the RTV around the insulators sets, the remaining unfilled length of sheath 2 is filled with RTV 16 and a flexible metallic sheath 17 is inserted into the sheath and into the RTV. After the RTV sets, the thermocouple is complete. The flexible metallic sheath and the thermocouple wire may be any length common for thermocouples of the same type. When being prepared for connection for service, the flexible sheath may be cut to desired length, and the exposed end of the thermocouple wire may be suitably stripped to reveal the iron conductor 6 and associated insulation 9 and the constantan conductor 4 and associated insulation 18.

An alternative embodiment of thermocouple is shown in FIG. 2. The numeral 41 indicates the thermocouple assembly of this embodiment. An outside protective sheath 42 is made of a portion of a stainless steel tube, with a wall thickness of 0.049 inches, typically, and length from, typically, two inches to 6 inches, depending upon the application. Thermocouple wire 28, comprising two conductors, either solid or stranded, insulation over each conductor and, usually, a braided insulation wrap 34 over both insulated conductors is used herein. Tip 23 is made of constantan and is machined or worked to be rounded on the outside of the tip, while a hole 45 is drilled from the opposite end along the axial center of the tip to a depth that leaves a wall thickness at the end of approximately 0.010 to 0.030 inches, depending upon the needs of the application. The hole 45 may be made first with a drill of normal shape and finished with a drill with a round end to remove sharp corners and associated stress risers. A small hole 27, marginally larger than the size of a wire to be inserted, is drilled through the tip, and another hole 25 marginally larger than the wire to be inserted, is drilled on an angle through the wall near the opposite end of the tip. An end of a thermocouple wire 28 is stripped to reveal a constantan conductor 24 and iron conductor 26, with the constantan conductor suitably shortened to accommodate the distance between the hole 27 at the end of the tip and the hole 25 through the sidewall. The tip in this figure is shaped so that there is a step in the diameter where the tip mates to the portion of a ceramic insulator 29 that protrudes through the swaged end 43 of the sheath 42. Both the tip and the protruding portion of the ceramic have the same diameter in the embodiment shown, though this is not necessary, either one could be larger than the other. The length of the protruding constantan tip from the mating surface 44 to the outside end of the tip marked 23 is typically ¼ inch to 3 inches, but the actual length is dependent upon the application.

The constantan conductor 24 is inserted through the hole 25 and the iron conductor 26 is inserted through the hole 27 at the end of the tip. The protruding wires are then welded to the tip at the points of protrusion. The bead 30 at the hole 27 forms a thermocouple junction at the outside surface of the tip. The weld at the hole 25 of two constantan materials is shaped to conform to the shape of the neighboring surface of the tip. Insulator 29 is machined from a hard ceramic, for example, a mica based ceramic, which is commercially available. It is desirable for the insulator material to have a low thermal conductivity, a low specific heat, be sufficiently stiff that it will not distort under pressure and be sufficiently strong that it will not break under pressure of the application.

A sealant 31 is made of the silicon rubber known as RTV, commercially available from a Division of GE that makes silicon rubber products. The components are covered with the RTV and then inserted into the sheath. Sheath 42 has a threaded internal surface 33 for a portion of its length. An insert 32 with matching threads on the outside and means for engagement with a turning tool is inserted into sheath 42 and turned by use of the turning tool (not shown) until the insert 32 and insulator 29 are seated against the swaged end 43 of the sheath 42. Additional RTV 39, generally a small amount, may then be inserted into a passage 62 in the insulator 29 through which the thermocouple wire passes, as necessary. The thermocouple is held with the tip end down so that the open end is up until this RTV 39, has set. Then, in the next operation, another batch of RTV 35 can be mixed and more RTV 35 can be inserted into the sheath until the sheath is filled, and an over-braid 34 is placed over the thermocouple wire 28 and pushed down a distance into the RTV 35. Alternately, the over-braid may be pushed along the wire down into the sheath and then the RTV 35 can be inserted into the sheath until the sheath is filled. In either arrangement, when the RTV 35 has set, then ends 36 and 37 of the thermocouple wire with braided shield 34 may be prepared for use in service, in a manner well understood by trained instrument and control technicians. The braided shield may be made of various materials, according to the application. For example, stainless steel or a fiber such as Nylon, Teflon, or fiberglass may be used.

An alternative embodiment of a thermocouple is shown in FIG. 3. The numeral 51 represents the thermocouple assembly of this embodiment. It is a variation of the embodiment of a thermocouple that is shown in FIG. 1. The contents of this embodiment of FIG. 3 are identical to the contents of the embodiment of FIG. 1 through the completion of the swaging operation that makes crimp 15 in the sheath. After the RTV around the insulators sets, the remaining unfilled length of sheath 2 is filled with RTV 16 and a flexible insulating tubing 55 is drawn over the thermocouple wire and is inserted into the sheath and into the RTV a suitable distance, preferably the 2 inches to the steel ring 14. The material and constituency of the flexible insulating tube depends upon the application, with a non-porous thin-walled tube made of Teflon® being a prime candidate for many applications. Then, a flexible metallic sheath 17 is inserted into the outer sheath and into the RTV. After the RTV sets, the thermocouple is complete. The flexible metallic sheath and the thermocouple wire may be any length common for thermocouples of the same type. When being prepared for connection for service, the ends of the flexible metallic sheath, the flexible insulating tube and the thermocouple wire may be cut to desired lengths advantageous for making required connections, such as may be done with other thermocouples having similar protective construction. The exposed end of the thermocouple wire may be suitably stripped to reveal the iron conductor 6 and associated insulation 9 and the constantan conductor 4 and associated insulation 18.

An alternate means of construction for the thermocouple wire that passes through the central hole in the insulators within the outer sheath of any of these embodiments is to use a ceramic tube of small outside diameter that has two smaller holes through which the conductors pass. This means of construction permits RTV to be inserted inside the two small holes to seal the conductors.

Another means of construction is to use a series of ceramic or glass beads each bead having two small holes through which the conductors pass, thereby providing a method for installing a sealant between the beads that will prevent a liquid from passing through the thermocouple.

Numerous other variations in the construction of the thermocouple of this invention, within the scope of the appended claims, will occur to those skilled in the art in the light of the foregoing disclosure. Merely by way of example, the tip can be made of Chromel and the wires from chromel and alumel, or the tip can be made of constantan and the wires from constantan and copper, or alternately, the tip could be made of copper and the wires of constantan and copper. The selections of materials and shape of the tip depend upon the application, including temperature range, as well as pressures and flows to which the tip is subjected. It is simply important that the tip, formed to extend into the medium the temperature of which is to be measured, be made of one of the components of the thermocouple, and a conductor or wire of the other of the components extend into and be electrically connected to the tip at a location suitable for measuring the temperature of the application, and a conductor or wire of the same composition as the tip, be electrically connected to the tip at a place spaced from the electrical connection of the other of said components.

Having thus described the invention, what is claimed and desired to be secured by Letters Patent is:

1. In a two wire thermocouple, the improvement comprising, a hollow tip formed of the material of one of said thermocouple wires, said tip being adapted to extend into a medium the temperature of which is to be measured, both of said wires extending into a passage in said tip through an open outer end of said passage in said tip toward an inner, closed, end of said passage, said closed end having a small hole in it, one of the two thermocouple wires, of a material different from said tip, extending entirely through said passage and said small hole, and being welded at the outside of said tip at said inner end of said passage to form a thermocouple junction and the other of said thermocouple wires, of the same material as said tip, being welded to said tip at a place spaced from the said junction.

2. The improvement of claim 1 wherein the tip is made of constantan and the thermocouple wires are constantan and iron.

3. The improvement of claim 1 wherein the tip is made of constantan and the thermocouple wires are constantan and copper.

4. The improvement of claim 1 wherein the hollow tip has a rounded end at the end of the passage through which the said one of the thermocouple wires extends entirely.

5. The improvement of claim 1 wherein said tip is made with a flange on the open end, the purpose of said flange being to retain said tip in said thermocouple assembly.

6. The improvement of claim 1 wherein the tip is very thin at the location of the small hole through which the thermocouple wire extends and is welded to form the thermocouple junction.

7. The improvement of claim 1 wherein the tip is elongated and the external surface comprises three sections, a closed end being rounded, a transition section adjacent the rounded end, and a cylindrical section of a uniform diameter extending between the transition section and the open outer end.

8. The improvement of claim 7 wherein the transition section is a flat radial surface with an OD matching the diameter of the rounded closed end and the ID matching the diameter of the cylindrical shank.

9. In an assembly of a thermocouple, comprising a sheath, a hollow tip, an insulator for separating said tip from said sheath, and thermocouple wires of two distinct materials suitable for making a thermocouple junction, the improvement comprising said tip being made from the same material as one of the thermocouple wires and different from the material from which the other thermocouple wire is made, a hole in said tip from an open end to a closed end of said tip, said closed end being a thin wall with a small hole in the center of the end, said holes constituting a passage defined by a side wall, the thermocouple wire of a material different from said tip being inserted through said small hole in said end of said tip and welded to said end of said tip to form a bead that forms a thermocouple junction, the thermocouple wire of material common to said tip being inserted through a small hole in said side wall, said thermocouple wire of common material being welded to said side wall of said tip, said tip being electrically isolated from said sheath by means of said insulator.

10. The improvement of claim 9 wherein the sheath is swaged at an end to form a seat for the insulator to seat against.

11. The improvement of claim 9 wherein the sheath is stainless steel.

12. The improvement of claim 9 including a threaded interior wall of the sheath and a mating insert with an external thread to match the thread of the internal wall of the sheath, said insert having an exposed end with an engagement means for a turning tool.

13. The improvement of claim 9 wherein the hollow tip is rounded on the outside of the closed end and has an outside diameter that is the same as the portion of the insulator protruding from the sheath, the tip has a transition section to a shank of smaller diameter than the outside diameter of the rounded tip, and the shank has an extended length to the open end of the tip.

14. The improvement of claim 9 wherein the insulator is a mica-based ceramic.

15. The improvement of claim 9 wherein said insulator is a ceramic, and said improvement includes a ductile metallic backing ring located against the ceramic insulator and a swage of the sheath to produce a reduced diameter preventing the backing ring and other internal components from moving when the tip end of the sheath is subjected to a liquid under pressure.

16. The improvement of claim 15 wherein a backing ring is made of a stainless steel.

17. The improvement of claim 9 including a sealant to seal the components within said sheath to prevent a liquid from passing through gaps between the components.

18. The improvement of claim 17 wherein the sealant is a silicone rubber compound.

19. The improvement of claim 18 wherein said silicone rubber compound is capable of surviving in a 500 degree Fahrenheit environment continuously, and can survive if the temperature has an excursion to 650 degrees Fahrenheit occasionally.

20. The improvement of claim 9 including multiple layers of protective flexible sheathing, all of which are connected to and extending from the end of the sheath that does not contain the tip, said multiple layers of flexible sheathing extending the length of the thermocouple wires, except for a sufficient length of exposed thermocouple wire as is necessary for connections for the particular application.

21. The improvement of claim 20, wherein there is an internal protective sheathing made of a flexible insulating tube and there is an external flexible sheathing made of a spiral corrugated metallic sheath.

22. The improvement of claim 21 wherein the internal protective sheathing is made of polytetrafluoroethylene.

23. The improvement of claim 9 including a protective flexible sheathing connected to and extending from the end of the sheath that does not contain the tip, said flexible sheathing extending along the length of the thermocouple wires.

24. The improvement of claim 23 wherein the flexible sheathing is braided stainless steel.

25. The improvement of claim 23 wherein the flexible sheathing is a spiral corrugated metallic sheath.

26. The improvement of claim 23 wherein the flexible sheathing is braided fiberglass material.

27. The improvement of claim 23 wherein the flexible sheathing is a flexible tube.

28. The improvement of claim 27 wherein the flexible tube is comprised of a plastic.

29. The improvement of claim 27 wherein the flexible tube is comprised of polytetrafluoroethylene.

30. The improvement of claim 27 wherein the flexible tube is comprised of a rubber.

31. In an assembly of a thermocouple, comprising a sheath, a hollow tip, an insulator for separating said tip from said sheath, a thermocouple wires of two dissimilar materials suitable for making a thermocouple junction, and sealant, the improvement comprising said tip being made from the material common to one of the thermocouple wires, a closed end of the tip being a thin wall with a small hole in the center of the end, the thermocouple wire of a non-common material being inserted through said hole in said end of said tip and welded to said tip to form a bead that forms a thermocouple junction, a thermocouple wire of material common to the tip being inserted through a small hole in the side wall of said tip at some distance from said thermocouple junction at said end of said tip, said thermocouple wire of common material being welded to said side wall of said tip, said tip being electrically isolated from said sheath by means of an insulator, and said sealant serving to prevent a liquid from passing through the length of the sheath.

* * * * *